(12) United States Patent
Lee et al.

(10) Patent No.: US 7,391,767 B2
(45) Date of Patent: Jun. 24, 2008

(54) METHOD FOR PROVIDING IP MULTICAST SERVICE USING VIRTUAL LAN

(75) Inventors: Jong-kuk Lee, Daejeon (KR); Hae-won Jung, Daejeon (KR); Hyeong-ho Lee, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 984 days.

(21) Appl. No.: 10/383,054

(22) Filed: Mar. 7, 2003

(65) Prior Publication Data

US 2004/0076162 A1 Apr. 22, 2004

(30) Foreign Application Priority Data

Oct. 16, 2002 (KR) .................. 10-2002-0063150

(51) Int. Cl.
*H04L 12/28* (2006.01)
(52) U.S. Cl. ....................... 370/389; 370/400
(58) Field of Classification Search ............... None
See application file for complete search history.

(56) References Cited

U.S. PATENT DOCUMENTS

| | | | | | |
|---|---|---|---|---|---|
| 5,634,011 | A | * | 5/1997 | Auerbach et al. | 709/242 |
| 5,684,800 | A | * | 11/1997 | Dobbins et al. | 370/401 |
| 5,959,989 | A | | 9/1999 | Gleeson et al. | |
| 6,112,251 | A | | 8/2000 | Rijhsinghani | |
| 6,331,983 | B1 | * | 12/2001 | Haggerty et al. | 370/400 |
| 6,370,142 | B1 | * | 4/2002 | Pitcher et al. | 370/390 |
| 6,484,209 | B1 | * | 11/2002 | Momirov | 709/238 |
| 6,556,547 | B1 | * | 4/2003 | Srikanth et al. | 370/317 |
| 6,570,875 | B1 | * | 5/2003 | Hegde | 370/389 |
| 6,614,787 | B1 | * | 9/2003 | Jain et al. | 370/390 |
| 6,640,251 | B1 | * | 10/2003 | Wiget et al. | 709/238 |
| 6,847,620 | B1 | * | 1/2005 | Meier | 370/328 |
| 6,934,292 | B1 | * | 8/2005 | Ammitzboell | 370/400 |
| 6,977,891 | B1 | * | 12/2005 | Ranjan et al. | 370/229 |
| 2002/0001310 | A1 | * | 1/2002 | Mai et al. | 370/390 |
| 2002/0046271 | A1 | * | 4/2002 | Huang | 370/256 |
| 2002/0120769 | A1 | * | 8/2002 | Ammitzboell | 709/238 |
| 2002/0126671 | A1 | * | 9/2002 | Ellis et al. | 370/390 |
| 2004/0078624 | A1 | * | 4/2004 | Maxemchuk et al. | 714/4 |
| 2005/0180345 | A1 | * | 8/2005 | Meier | 370/401 |

OTHER PUBLICATIONS

Steve Deering; "Host Extensions for IP Multicasting"; RFC 1112; Jun. 4, 2002, 13:33; pp. 1-17.
LAN MAN Standars Committee of the IEEE Computer Society; "IEEE Standards for Local and Metrhpolitan Area Networks: Virtual Bridged Local Area Networks"; IEEE Std 802. Oct. 1988; pp. 1-199.

* cited by examiner

*Primary Examiner*—Huy D. Vu
*Assistant Examiner*—Phuongchau B Nguyen
(74) *Attorney, Agent, or Firm*—Lowe Hauptman Ham & Berner LLP

(57) ABSTRACT

A method for providing IP multicast service using a VLAN in a network including an IP multicast/VLAN manager for supporting an IGMP and a GVRP, and multicast group members, includes: after generating an IP multicast group, allowing a sender to request the IP multicast/VLAN manager to search for at least one host joining the IP multicast group; allowing the IP multicast/VLAN manager to check whether the host supports the VLAN; and allowing the sender to transfer a packet through the VLAN if the host joining the IP multicast group supports the VLAN and allowing the sender to broadcast a packet though IP multicast if not.

6 Claims, 5 Drawing Sheets

METHOD FOR PROVIDING IP MULTICAST SERVICE USING VIRTUAL LAN

BACKGROUND OF THE INVENTION

1. Field of the Invention

The present invention relates to a method for providing IP (Internet Protocol) multicast service using a virtual LAN (Local Area Network), and more particularly to a method for providing IP multicast service using a virtual LAN, wherein the method can provide efficient multicast service in a very high-speed network and rapidly process data by applying the virtual LAN to the IP multicast service.

2. Description of the Prior Art

Generally, multicasting is a data transmission method capable of efficiently employing resources of a network, whereby a specific group is organized and data is broadcast to a corresponding group so that the number of data transmissions by one sender can be reduced. Thus, the sender can send data to countless receivers through one data transmission, and the data is prevented from being sent to a destination if the destination does not want to receive the data, thereby preventing unnecessary network use (RFC 1112: Host Extensions for IP Multicasting, S. Deering, August 1989). Moreover, IP multicasting can maximally utilize bandwidth, maximally reduce a sender load, and efficiently employ the resources of the network. However, there is a problem in that, because the IP multicast necessarily needs software to carry out operations associated with a lower-order physical layer and a higher-order network layer, the IP multicast cannot acquire a desired bit rate in a very high-speed network. Moreover, there is a disadvantage in that all equipment in the network (including router, etc.) should support the IP multicast.

On the other hand, a VLAN (Virtual Local Area Network) is restricted to a configuration of a physical network by Network Administrator. In the VLAN, a logical network between network components can be flexibly formed and a bit rate is very high. That is, where a new network is configured, the network does not have to be physically configured, thereby saving costs for physically configuring the network. Through a VLAN function, the new network can be logically configured without any physical variation. The VLAN includes a port based VLAN, a layer 2 based VLAN and a policy based VLAN according to a user's network (IEEE 802.1Q, Virtual Bridged Local Area Network, IEEE 802.1, December 1998). Because the VLAN is implemented by hardware, it can achieve a relatively high bit rate. As the user cannot change or re-configure the network, only Network Administrator is able to change it. Furthermore, the VLAN is based on a protocol such as a GMRP (GARP Multicast Registration Protocol) for multicast communication, but the protocol support only single multicast address, so that this protocol is not able to make multiple multicast addresses.

FIG. 1 roughly shows a conventional IP multicast structure. Referring to FIG. 1, in a case of the conventional IP multicast, session information is transferred through an SDP (Session Description Protocol) and a host as a member desiring to join or leave a group can join or leave the group associated with a "JoinHostGroup/LeaveHostGroup" process through an IGMP (Internet Group Management Protocol). As described above, the member's joining or leaving is managed by an IGMP router 11 as a multicast router through the IGMP. Thus, data is sent to only joiners in the groups of a network A 12 and a network B 13. In this method, IGMP routers 11 should necessarily carry out all operations associated with OSI (Open Systems Interconnection) 1st~3rd layers 14. Where the amount of traffic increases and the joining or leaving of group members frequently occurs, there is a problem in that the IGMP routers 11 should carry a heavy load.

On the other hand, FIG. 2 roughly shows a conventional VLAN structure. The VLAN forms one group by designating a sub-network management group between network devices through a GVRP (GARP VLAN Registration Protocol) 22. That is, the group formed through the GVRP 22 can be identified as a group formed by the VLAN. Accordingly, data sent from the sender 21 is broadcast to the group formed through the GVRP 22. Since the GVRP 22 is a hardware-based protocol, a bit rate in the GVRP 22 is very high, but the user cannot readily intervene in the GVRP 22 and only a network device manager can directly intervene in the GVRP 22.

On the other hand, as a prior art patent associated with an IP multicast/VLAN, there is U.S. Pat. No. 6,112,251 entitled "Virtual Local Network for Sending Multicast Transmission to Trunk Station", Anil G. Rijhsinghani, August 2000. As disclosed in the prior art patent, both IP multicast information and VLAN information is contained in a protocol header so that network equipment can use only information capable of being processed by its own equipment and therefore have flexibility. FIG. 3 shows a structure of the IP multicast/VLAN disclosed in the prior art patent. Where a message having the protocol header containing both IP multicast information and VLAN address information is sent to a network in FIG. 3, network equipment 31, 32 and 33 selects and processes desired information between the IP multicast information and the VLAN address information. However, there is a problem in that a multicast group manager is not considered in the IP multicast/VLAN and that the network equipment should support a specific protocol disclosed in the prior art patent.

With regard to a combination of the VLAN and the IP multicast, only a protocol has been proposed, and structures and detailed operations of management programs have not been yet proposed. In particular, upon combining the VLAN and the IP multicast, problems associated with a network's transmission speed and global utility should be addressed.

SUMMARY OF THE INVENTION

Therefore, the present invention has been made in view of the above problems, and it is an object of the present invention to provide a method for providing IP (Internet Protocol) multicast service using a virtual LAN (Local Area Network), the method being capable of providing the IP multicast service at a desired bit rate in a very high-speed network by introducing the virtual LAN supported by a lower-order layer to IP multicast.

In accordance with one aspect of the present invention, the above and other objects can be accomplished by the provision of a method for providing IP (Internet Protocol) multicast service using a VLAN (Virtual Local Area Network) in a network including an IP multicast/VLAN manager for supporting an IGMP (Internet Group Management Protocol) and a GVRP (GARP VLAN Registration Protocol), and multicast group members, comprising the steps of: a) after generating an IP multicast group, allowing a sender to request the IP multicast/VLAN manager to search for at least one host joining the IP multicast group; b) allowing the IP multicast/VLAN manager to check through a router directly coupled to the host whether the host supports the VLAN; and c) allowing the sender to transfer a packet through the VLAN if the host joining the IP multicast group supports the VLAN and allowing the sender to broadcast a packet through IP multicast if the host joining the IP multicast group does not support the VLAN.

Preferably, the IP multicast/VLAN manager may performs an IP multicast router and the sender may select the IP multicast/VLAN manager.

Preferably, the step a) may further include the steps of: a1) allowing the sender to request the IP multicast/VLAN manager to manage registration or withdrawal of a host in and from the generated IP multicast group; a2) allowing the sender to give notice of a multicast session through an SDP (Session Description Protocol) if the IP multicast/VLAN manager accepts the request; and a3) allowing the IP multicast/VLAN manager to register or withdraw the host in and from the IP multicast group if the host requests the IP multicast/VLAN manager to register or withdraw the host in and from the IP multicast group. At this time, the SDP may have a new field so that the IP multicast group can use the VLAN, and the host may be registered in the VLAN and the IP multicast group using the SDP.

Preferably, the step c) may include the step of: if the host supports both VLAN and IP multicast, allowing the sender to primarily transfer the packet using the VLAN and to secondarily transfer the packet using the IP multicast.

The present invention relates to a method for providing IP multicast service using a VLAN. The present invention can improve a bit rate of the IP multicast service by applying the VLAN to the conventional IP multicast and provide a method for providing an IP multicast service using the VLAN so that efficient communication can be enabled. The pre-existing IP multicast network is made up of a multicast router and multicast group members and the pre-existing VLAN is made up of network equipment and VLAN members. However, the IP multicast network using the VLAN in accordance with the present invention includes the IP multicast/VLAN manager as network equipment of the IP multicast/VLAN and multicast group members.

The IP multicast/VLAN manager simultaneously supports the IGMP and the GVRP, and transfers and manages group information by converting the generated IP multicast group into a VLAN group. Moreover, the IP multicast/VLAN manager primarily transfers multicast information upon transferring the multicast information, and processes and manages the SDP. As described above, the present invention can equally handle the IP multicast group and the VLAN group generated by the IGMP and the GVRP by adding a function of supporting the GVRP of the VLAN to the pre-existing multicast router.

BRIEF DESCRIPTION OF THE DRAWINGS

The invention will be described in detail with reference to the following drawings in which like reference numerals refer to like elements wherein.

DESCRIPTION OF THE PREFERRED EMBODIMENTS

The above-described object, features and advantage of the present invention will become apparent from the following detailed description. Now, preferred embodiments of the present invention will be described in detail with reference to the annexed drawings.

Figure 1:
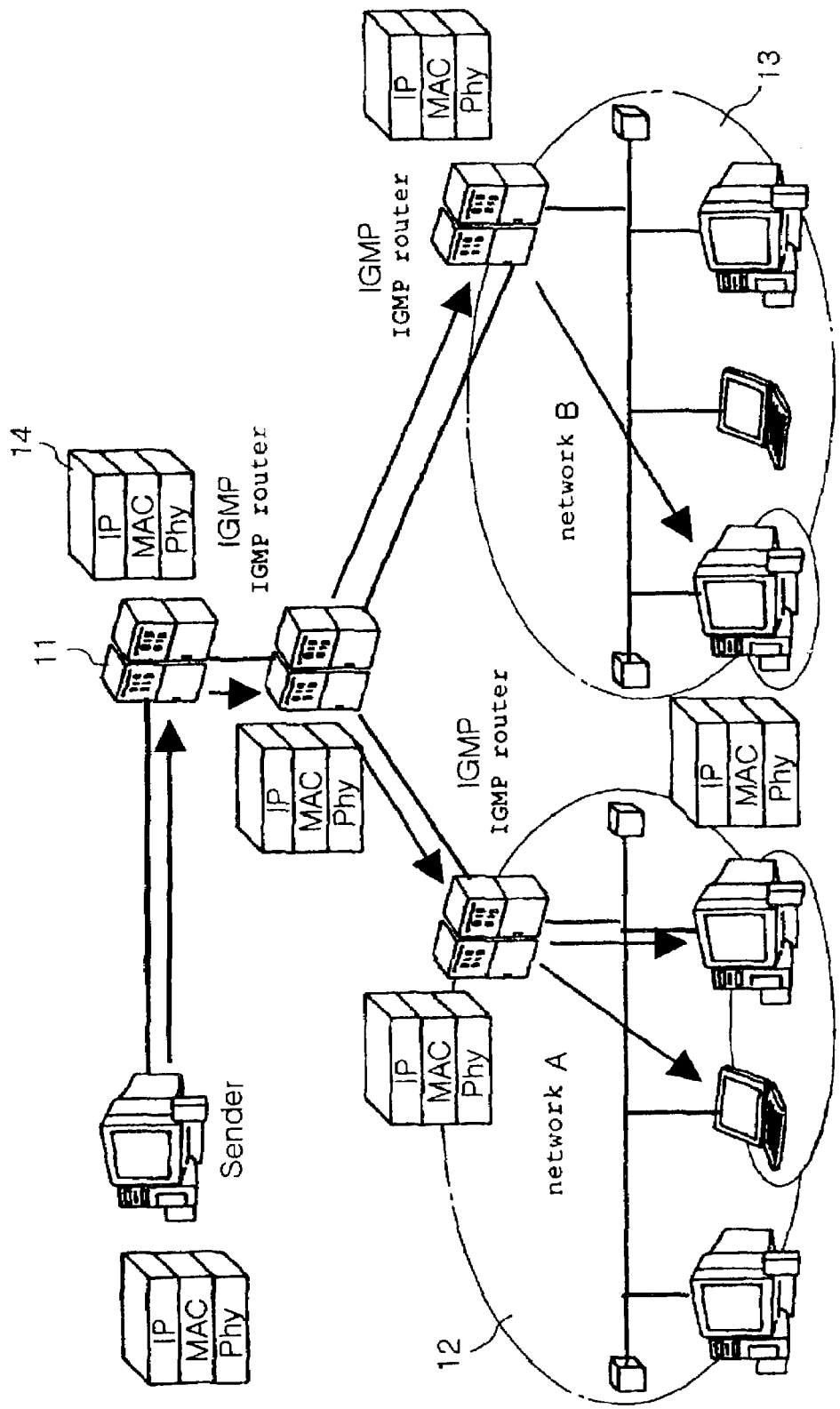
FIG. 1 is a view illustrating a conventional structure of an IP (Internet Protocol) multicast network.
Figure 2:
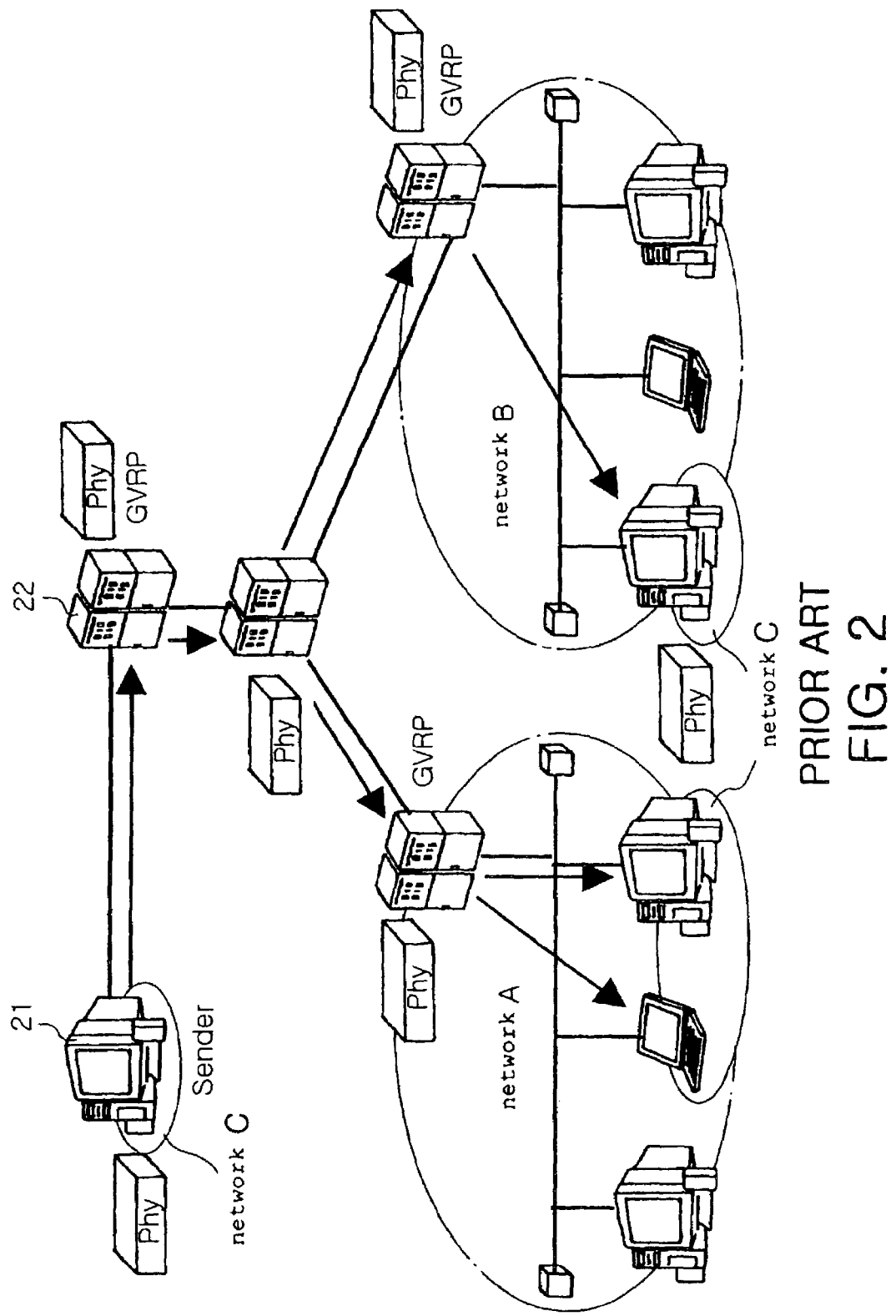
FIG. 2 is a view illustrating a conventional structure of a virtual LAN (Local Area Network)
Figure 3:
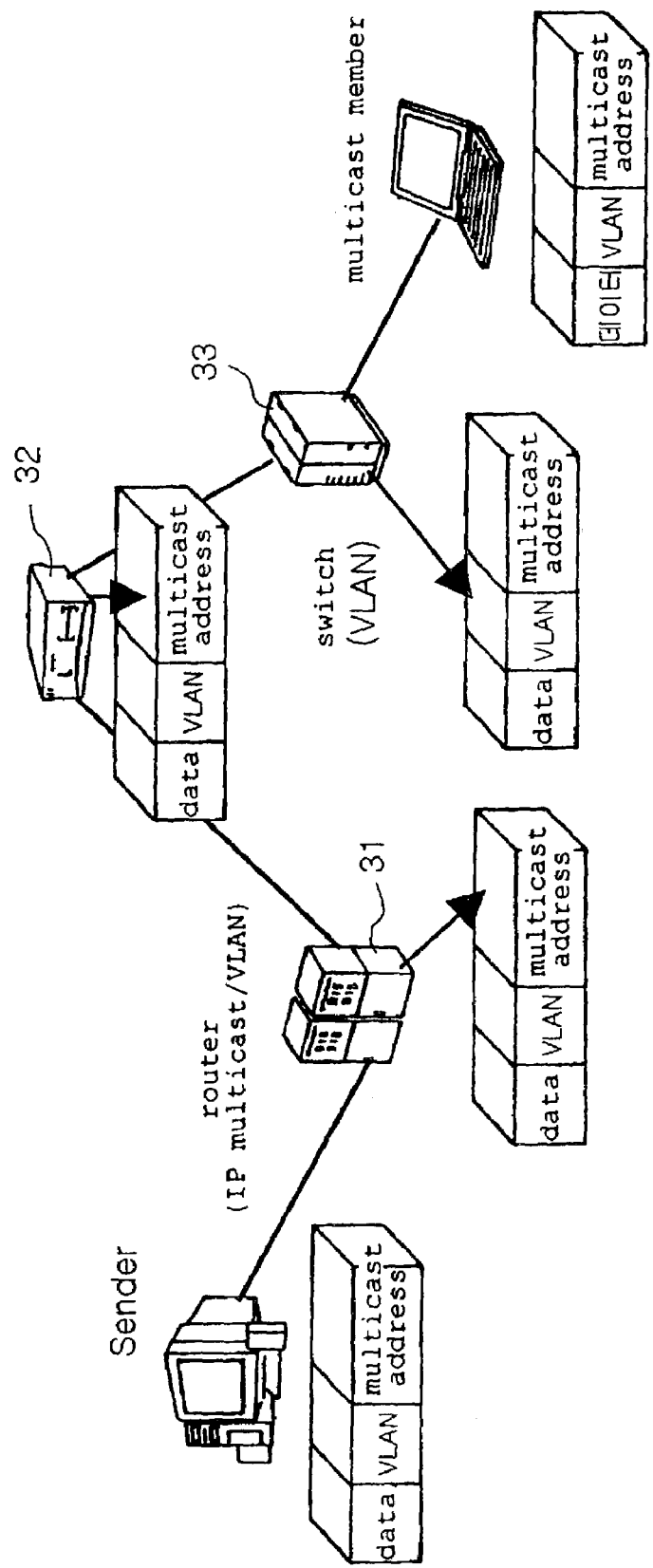
FIG. 3 is a view illustrating a conventional integrated structure of an IP multicast/virtual LAN.
Figure 4:
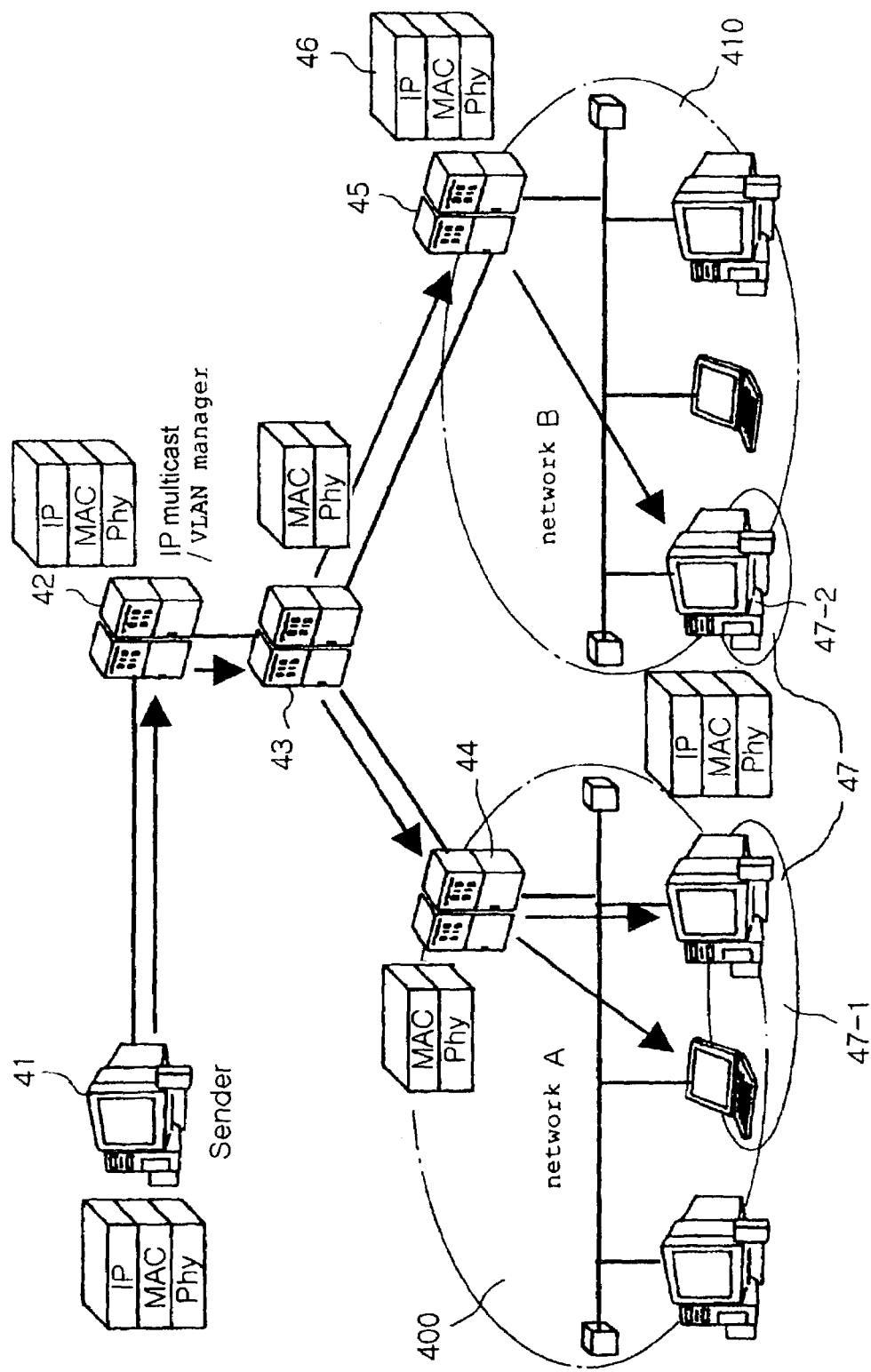
FIG. 4 is a view illustrating a structure of an IP multicast/virtual LAN in accordance with an embodiment of the present invention.

FIG. 4 is a view illustrating a structure of an IP (Internet Protocol) multicast/VLAN (Virtual Local Area Network) in accordance with an embodiment of the present invention. Referring to FIG. 4, a plurality of networks 400 and 410 are coupled to a plurality of routers 42, 43, 44 and 45 in the structure of the IP multicast/VLAN in accordance with the present invention. An IP multicast/VLAN manager 42 for supporting an IGMP (Internet Group Management Protocol) and a GVRP (GARP VLAN Registration Protocol), and multicast group members 47 are basically configured in the IP multicast/VLAN. The IP multicast/VLAN includes a router 44 supporting the VLAN/IP multicast and a router 45 supporting the IP multicast. The IP multicast/VLAN manager 42 further performs as an IP multicast router. At this time, the IP multicast/VLAN manager 42 is preferably selected by a sender 41, which desires to send an IP multicast packet. The sender 41 requests the IP multicast/VLAN manager 42 to announce multicast session and make the multicast group 47 using an SDP (Session Description Protocol) so that the IP multicast packet can be sent to a desired multicast group 47. In response to the request, the IP multicast/VLAN manager 42 sends a message, necessary for checking whether hosts belonging to the multicast group 47 can support the VLAN, to the routers 44 and 45 coupled to the host group 47. At this time, the IP multicast/VLAN manager 42 sends the message, necessary for checking whether the hosts belonging to the host group 47 can support the VLAN, to the routers 44 and 45 through a plurality of routers 43 (including routers not shown in FIG. 4). The routers 44 and 45 then send an acknowledgement message to the IP multicast/VLAN manager 42 if the hosts of the multicast group 47 support the VLAN. If not, the routers 44 and 45 do not send the acknowledgement message to the IP multicast/VLAN manager 42. In FIG. 4, the network 400 supports the VLAN, but the network B 410 does not support the VLAN.

On the other hand, a host as a group member desires to join or leave the multicast group 47, which wants to use the IP multicast service, joins or leaves the multicast group 47 through the IGMP. If a network (e.g., the network A 400) associated with a host, joining the multicast group 47, which desires to use the IP multicast service, supports the VLAN, a VLAN sub-network group 47-1 joining an IP multicast group is formed within the network A 400. A packet is broadcast to the VLAN sub-network group 47-1 through the VLAN. In this case, the IP multicast/VLAN manager 42 interprets the broadcasting of the packet to the VLAN sub-network group 47-1 as the IP multicast. However, the IP multicast/VLAN manager 42 transfers the packet to a host 47-2 contained in the network B 410, which doesn't support the VLAN, through the IP multicast. The IP multicast/VLAN manager 42 further transfers the packet to a VLAN unavailable area through the IP multicast.

A new protocol field is added to the SDP so that an IP multicast network can use the VLAN. That is, a new field is added to a VLAN packet so that the VLAN packet is transferred as an IP multicast packet. Accordingly, the VLAN and the IP multicast network can be simultaneously employed. For this, hosts, desiring to use the IP multicast service, register themselves in a VLAN group and an IP multicast group.

Further, when the IP multicast service is provided in the IP multicast/VLAN, it is determined whether a host, desiring to use the IP multicast service, supports the VLAN. If the host, desiring to use the IP multicast service, supports the VLAN, the IP multicast/VLAN broadcasts a packet to the hosts through the VLAN first. If not, the IP multicast/VLAN broadcasts a packet to the hosts through the IP multicast. At this time, since the packet transferred through the VLAN can include the packet transferred through the IP multicast, the amount of work to be processed by a higher-order layer 46 is reduced and therefore the amount of work to be processed by network equipment is reduced, when the packet is transferred through the IP multicast.

Figure 5:
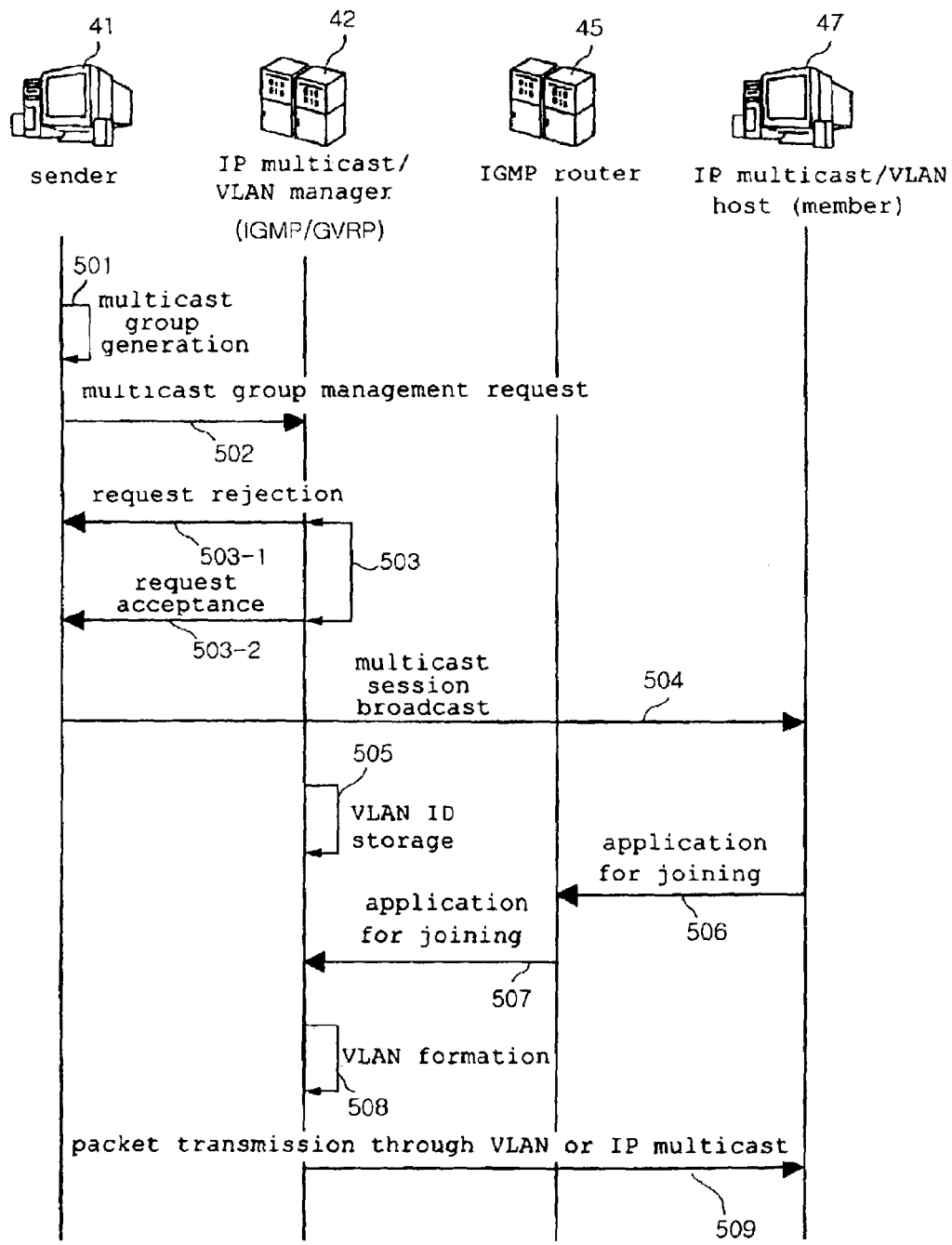
FIG. 5 is a flow chart illustrating a procedure of registering and withdrawing a host of a multicast group in and from an IP multicast/virtual LAN in accordance with the present invention.

FIG. 5 is a flow chart illustrating a procedure of registering and withdrawing a host of a multicast group in and from the IP multicast/virtual LAN in accordance with the present invention. The IP multicast/VLAN manager 42 in accordance with the present invention carries out a procedure of registering and withdrawing a host in and from the IP multicast/virtual LAN. Referring to FIG. 5, the sender 41 generates a multicast group at step 501. Through the IGMP, the sender 41 requests the IP multicast/VLAN manager 42 to manage joining or leaving of a host of the generated multicast group at step 502. The IP multicast/VLAN manager 42 accepts or rejects the request at step 503. If the IP multicast/VLAN manager 42 rejects the request at step 503-1, the IP multicast/VLAN manager 42 completes a procedure of registering and withdrawing a host of the multicast group in and from the IP multicast/virtual LAN. On the other hand, if the IP multicast/VLAN manager 42 accepts the request at step 503-2, the sender 51 broadcasts multicast session information to hosts through the SDP (Session Description Protocol: RFC 2327) at step 504. To use the VLAN in the IP multicast network, the SDP has the following additional protocol items.

At this time, the IP multicast/VLAN manager 42 stores a VLAN ID within the reception range of the SDP at step 505. If a host receiving the multicast session information broadcast from the sender 41 desires to join the multicast group, the host applies to the IP multicast/VLAN manager 42 through the IGMP for joining the multicast group at steps 506 and 507. If multicast communication is permitted within a management range of the IP multicast/VLAN manager 42, the IP multicast/VLAN manager 42 forms a new VLAN using the stored VLAN ID at step 508. The IP multicast/VLAN manager 42 checks an application message sent from the host desiring to join the multicast group and determines whether data can be transferred to the host through the newly formed VLAN. If data can be transferred to the host through the newly formed VLAN, the IP multicast/VLAN manager 42 transmits the data to the host through the VLAN. If not, the IP multicast/VLAN manager 42 transmits the data to the host through the IP multicast at step 509. On the other hand, if the IP multicast/VLAN manager 42 receives a message indicating the host's leaving from the group through the IGMP, it withdraws the host from the VLAN group and the IP multicast group. When the IP multicast/VLAN manager 42 registers or withdraws the host in or from the IP multicast/VLAN, it may use the GMRP, but it does not use the GMRP in the present invention. The reason why the GMRP is not used in the present invention is because the GMRP's multicast address is "0x01-80-C2-00-00-20" and a process due to the generated groups is complicated when a plurality of groups are generated.

The above-described detailed description and drawings of the present invention have been described in terms of preferred embodiments solely for the purpose of illustration. The present invention is not limited to the embodiments described, but may be defined only by the spirit and scope of the appended claims.

As apparent from the above description, the present invention can provide a method for providing IP multicast service using a virtual LAN, wherein the method can reduce the amount of work processed by network equipment upon transmitting a packet, because a process of a higher-order layer is not needed, as in the conventional IP multicast, and enable multicast communication to be efficiently used in very high-speed communication system of a Gbps class.

Moreover, the method of the present invention can improve utility, because both VLAN and IP multicast are used, and allow a user to arbitrarily generate a VLAN group. The method can be implemented by software rather than special equipment, thereby minimizing costs for implementing the method.

The above-described detailed description and the drawings are not intended to limit the present invention, and those skilled in the art will appreciate that various modifications, additions and substitutions are possible, without departing from the scope and spirit of the present invention.

What is claimed is:

1. A method of providing IP (Internet Protocol) multicast service using a VLAN (Virtual Local Area Network) in a network including an IP multicast/VLAN manager for supporting an IGMP (Internet Group Management Protocol) and a GVRP (GARP VLAN Registration Protocol), and multicast group members, said method comprising the steps of:
   a) after generating an IP multicast group, allowing a sender to request the IP multicast/VLAN manager to search for at least one host joining the IP multicast group, the step a) comprising the steps of:
      a1) allowing the sender to request the IP multicast/VLAN manager to manage registration or withdrawal of a host in and from the generated IP multicast group;
      a2) allowing the sender to give notice of a multicast session through an SDP (Session Description Protocol) if the IP multicast/VLAN manager accepts the request; and
      a3) allowing the IP multicast/VLAN manager to register or withdraw the host in and from the IP multicast group if the host requests the IP multicast/VLAN manager to register or withdraw the host in and from the IP multicast group;
   b) allowing the IP multicast/VLAN manager to check though a router directly coupled to the host whether the host supports the VLAN; and
   c) allowing the sender to transfer a packet through the VLAN if the host joining the IP multicast group supports the VLAN and allowing the sender to broadcast a packet through IP multicast if the host joining the IP multicast group does not support the VLAN;
   wherein the SDP has a new field so that the IP multicast group can use the VLAN.

2. The method according to claim 1, wherein the IP multicast/VLAN manager performs as an IP multicast router.

3. The method according to claim 1, further comprising the step of:
   allowing the sender to select the IP multicast/VLAN manager.

4. The method according to claim 1, wherein the host is registered in the VLAN and the IP multicast group using the SDP.

5. The method according to claim 1, wherein the step c) includes the step of:

if the host supports both VLAN and IP multicast, allowing the sender to primarily transfer the packet using the VLAN and to secondarily transfer the packet using the IP multicast.

6. The method according to claim 1, wherein said new field includes:

VLAN ID which is used by the multicast/VLAN manager to form the VLAN for hosts that supports VLAN and desire to join the IP multicast group; and IP address of the multicast/VLAN manager.

* * * * *